Dec. 3, 1968          G. L. TRAVERS          3,414,447
METHOD OF MAKING PNEUMATIC TIRE COVERS
Original Filed May 7, 1965          4 Sheets-Sheet 1
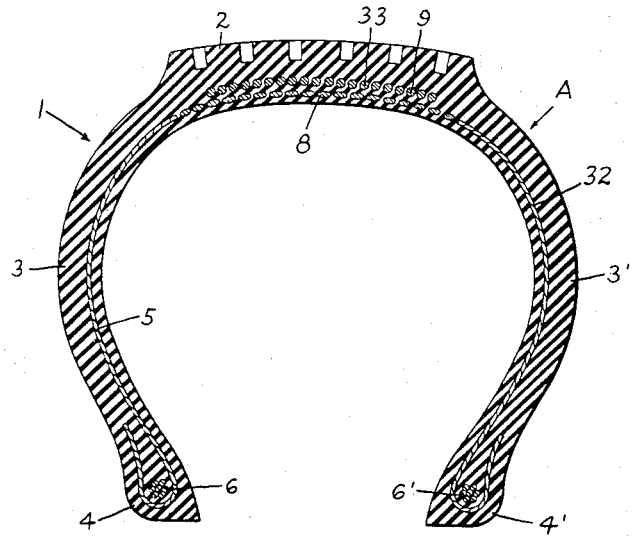
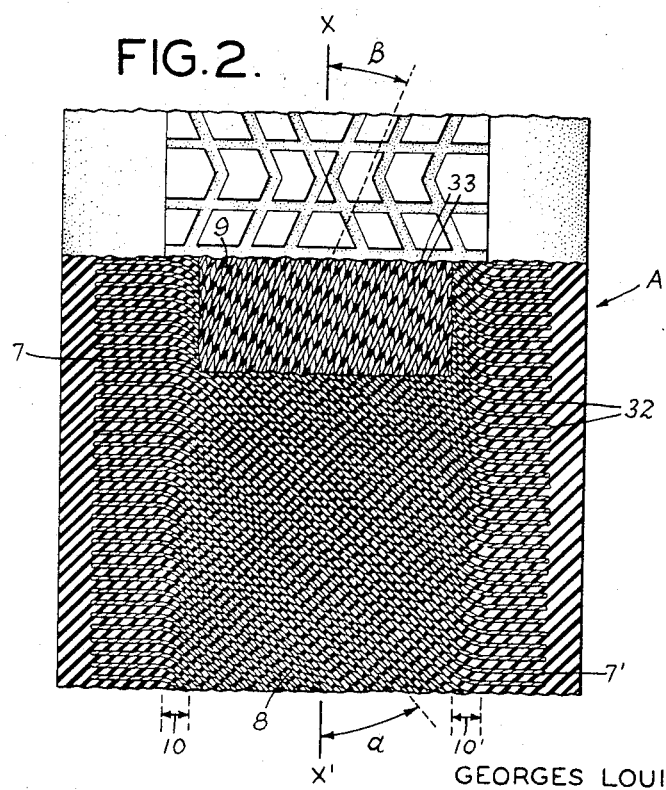
INVENTOR
GEORGES LOUIS TRAVERS
BY
HIS ATTORNEYS Dec. 3, 1968  G. L. TRAVERS  3,414,447
METHOD OF MAKING PNEUMATIC TIRE COVERS
Original Filed May 7, 1965  4 Sheets-Sheet 2
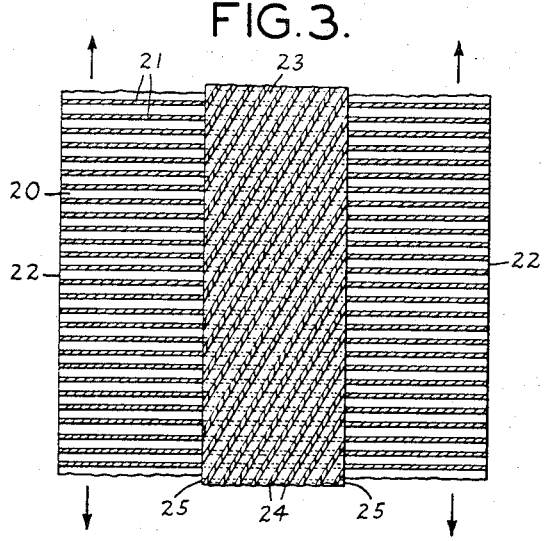
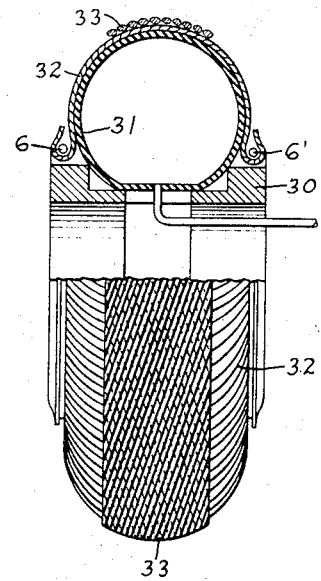
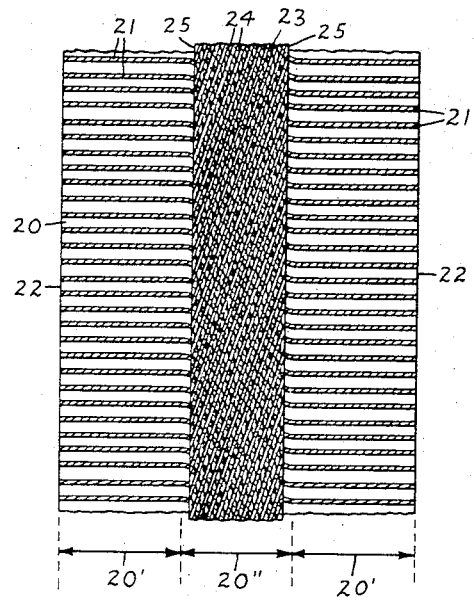
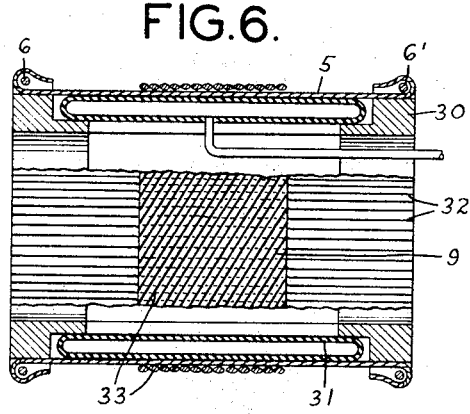
INVENTOR
GEORGES LOUIS TRAVERS
BY
HIS ATTORNEYS

INVENTOR
GEORGES LOUIS TRAVERS
BY

HIS ATTORNEYS

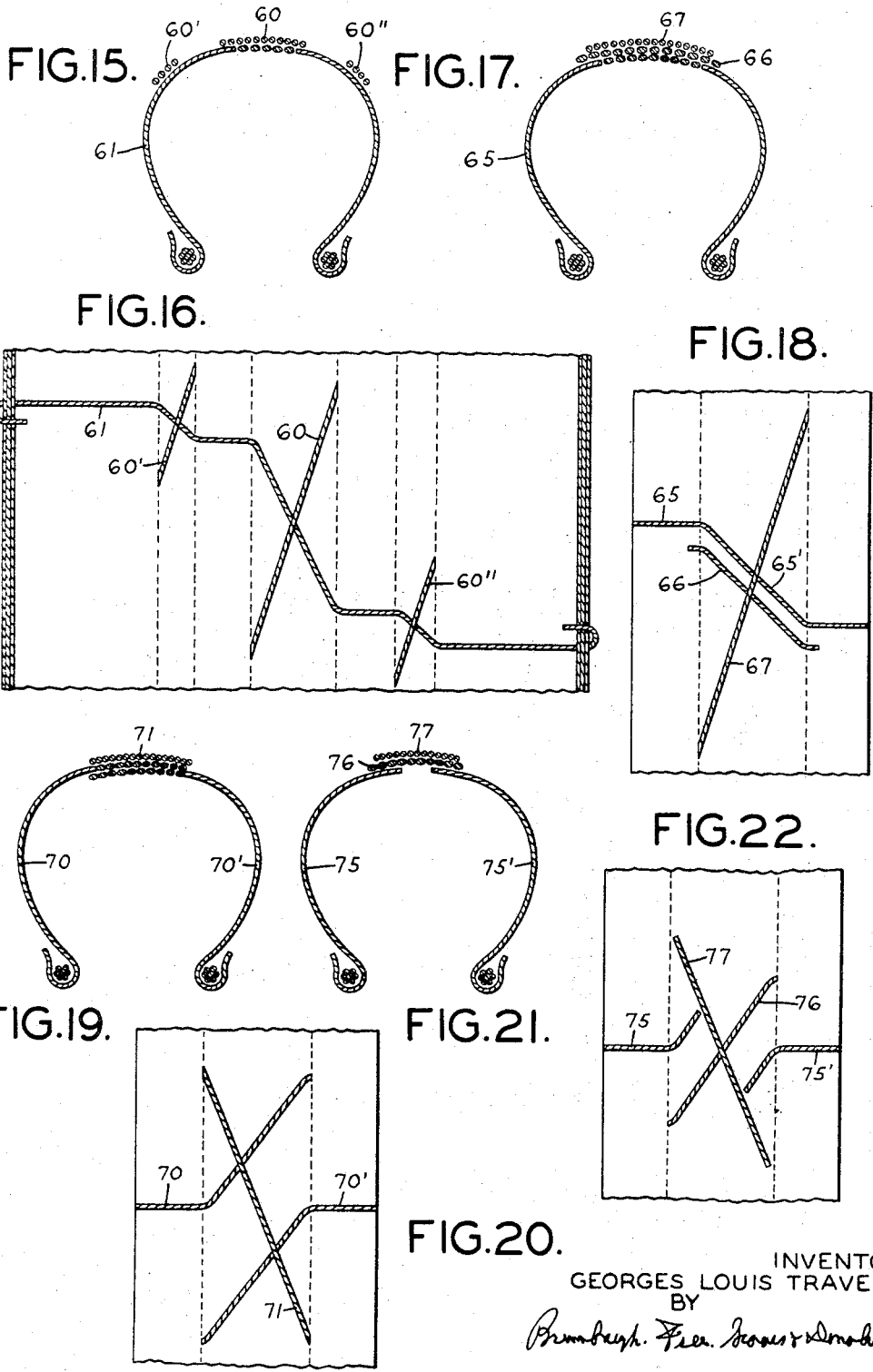

United States Patent Office 3,414,447
Patented Dec. 3, 1968

3,414,447
METHOD OF MAKING PNEUMATIC TIRE COVERS
Georges Louis Travers, Clermont-Ferrand, France, assignor to Compagnie Generale des Etablissements Michelin, raison sociale Michelin & Cie, Clermont-Ferrand, Puy-de-Dome, France
Original application May 7, 1965, Ser. No. 454,005, now Patent No. 3,327,753, dated June 27, 1967. Divided and this application Jan. 12, 1967, Ser. No. 608,914
Claims priority, application France, May 14, 1964, 1,804, Patent 1,413,102
11 Claims. (Cl. 156—131)

ABSTRACT OF THE DISCLOSURE

In the manufacture of radial carcass tires, a tread reinforcing ply of cords and at least one carcass ply of cords are assembled on a tire building drum with the cords of the carcass ply extending parallel with the axis of the drum and with the cords of the tread reinforcing ply inclined to the carcass cords. The tread, sidewalls and beads are assembled on the drum and the assembly is subjected to traction by converting it to approximate tire shape thereby to cause the cord portions of the carcass ply underlying the tread to be inclined relative to the cord portions which extend radially in the sides of the tire between its tread and its beads.

---

This application is a division of my U.S. application Ser. No. 454,005, filed May 7, 1965, now U.S. Patent No. 3,327,753.

Pneumatic tire covers comprise a body consisting of filaments such as threads, wires or cords embedded in the bulk of the cover This body gives strength to the cover. It should not prevent the deformations of the cover which are necessary to provide flexibility, particularly in the sidewalls, but at the same time it should prevent or reduce deformations which are harmful, especially within or under the tread.

Although the functions of a tire body are numerous and complex, attempts have been made for a long time to fulfill them by means of a tire body extending from one bead to the other and having a structure which was substantially homogeneous in all parts of the cover and which consisted of plies of substantially parallel threads or cords anchored around the two bead wires and laid on a bias with the cords of one ply crossing those of an adjacent ply. The direction of these cords is selected so as to compromise as much as possible between contradictory requirements.

In a tire with a carcass of cords in crossing or biased arrangement, the angle between the cords of two adjacent plies varies constantly and in a degree which varies according to the location of the point of crossing. Therefore, such a carcass is a cause of deformation for the tread and its reinforcement, unless, as already proposed, a layer of resilient rubber is placed directly above the carcass in the tread zone.

An important step forward has been achieved in the comparatively recent past. This step consists in taking into account the different functions of the body of the pneumatic tire cover and in designing this body, so as to make it heterogeneous by means of two different body parts, each one of which was particularly adapted to perform some of the functions of the body of the tire. One of these body parts, called the carcass, is formed of threads or cords extending from one bead to the other, or at least between the beads and the tread. In order to make the carcass flexible and strong, its threads or cords anchored around the bead wires are laid in radial planes and, therefore, do not cross one another and are comparatively independent from one another. The other body part, the so-called tread reinforcement, extends exclusively under the tread. Its purpose is to reinforce the tread so as to make it as undeformable as possible in directions paarllel to its surface; this aim is achieved by providing superimposed plies of parallel cords in which the cords of one ply cross the cords of another ply at suitable, preferably small, angles with relation to the longitudinal midplane of the tire. These tread reinforcing plies in crossed arrangement can be strengthened by various means, such as calendering the cables in hard rubber, or adding an additional triangulating ply which transforms the rhombus net into a triangulated net. A carcass ply can also serve as the additional ply.

This known structure, which combines a very flexible carcass and a rigid tread reinforcement has proved to be very satisfactory, particularly due to the dissociation of the sidewall body from the tread reinforcement. It enhances at the same time several qualities of the tire which, theretofore, could be improved only individually and at the cost of the others.

However, a rational study and observation of the conditions reigning in pneumatic tires built according to this new technique have brought to light certain facts and detected the points as to which an improvement to their structure might be desirable.

A first fact determined by this study is that the carcass, i.e., all of the cords anchored around the bead wires, does not substantially contribute towards transversely and longitudinally reinforcing the tread, even those parts of the carcass located in the zone under the tread, because of the radial orientation of the cords of this carcass. It is known that a radial carcass does not in itself possess much resistance to transverse stresses and therefore cannot contribute, in any substantial amount towards increasing the cornering power of the tire. It is, in fact, those cords which are laid obliquely to the longitudinal mid-plane of the tire, and more particularly those making with this plane a relatively small angle, which are by far the most suitable to prevent longitudinal and transverse deformations of the tread and, consequently, to impart to the tire high qualities of cornering power, resistance to wear and easy rolling. For this reason it has been suggested that the portion of the radial carcass which is located under the tread can be omitted, the continuity of the body being then, in this zone, insured by the tread reinforcement. However, in order to insure a reliable bond between the discontinued carcass and the tread reinforcement, an overlapping zone extending over a substantial part of the tread width is necessary. For this reason, it has been preferred to use a continuous carcass.

It has been proposed to use carcass cords extending radially in the sidewalls, with portions thereof under the tread departing from the radial plane. Also, tire covers have been reinforced by means of two cord plies extending from one bead to the other, in which the cords follow a radial path in the sidewalls but depart from it under the tread so that the oblique portions of the two plies make equal and opposite angles of substantial value with the longitudinal mid-plane of the tire. Moreover, tire carcasses have been suggested in which cords extend radially from one bead to the other and have turned up ends reaching up to the tread under which they then follow an oblique path, thus forming with the longitudinal mid-plane equal angles having the same or opposite signs. All three of these ply arrangements result in a carcass in which the cords are crossed or triangulated under the tread.

The advantages of a radial carcass are primarily due to the fact that the cords laid in planes radiating around the axis of the tire do not cross one another. It follows that the carcass cords can be deformed without interfering with one another, as opposed to crossed cords forming a lozenged net and which cannot react independently of one another under the strains to which they are submitted. Radial cords behave like parallel cords. This "parallelism" of carcass cords between them endows the sidewalls with a great flexibility and reduces the power consumption for rolling, as a result of the sidewalls developing less resistance to deformation. In another respect, the absence of crossing between carcass cords due to their radial position avoids introducing undesirable deformations, particularly under the tread.

Despite these advantages, the radial carcass has certain drawbacks caused by the carcass cords extending from one bead to the other along the shortest path, i.e., in a meridian plane. Any deformation which causes a portion of a radial cord to leave a meridian plane, results in an additional strain which adds to the tension due to the inflation pressure. Such additional tension may reach high values and produces shearing stresses within the elastomer around the cord, mainly in the sidewalls where the ends of the upturned carcass cords are located after having been led around the bead wires. These areas can be reinforced in different ways but the cause of the trouble is not eliminated.

The radial arrangement of the carcass cords has another unfavorable consequence. Under the effect of the centrifugal force, the tread reinforcement tends to move away from the axis of the tire cover, whereas the carcass assumes a more elongated profile in the radial direction and becomes narrower axially. It follows that the tread reinforcement tends to and sometimes does separate from the carcass at both sides of the tread under extreme operating conditions.

In accordance with the present invention, methods are provided for manufacturing tire covers having a tread reinforcement, a carcass extending from one bead to the other and formed of independent cords laid substantially radially between the beads and the tread reinforcement, but departing noticeably from the radial direction at least along a portion of the zone covered by the tread reinforcement.

As used herein the following terminology has the following meanings:

"Carcass," "carcass ply" or "carcass cords," refer to threads or cords anchored around the bead wires and extending along the sidewalls and under the tread; except where specified otherwise, such cords extend continuously from one bead to the other;

"Tread reinforcement" or "tread ply" refers to threads or cords extending under the tread proper and, except where otherwise stated, do not extend much beyond the edges of the tread; in any case, they do not extend further down than the mid-height of the sidewalls;

"Independent threads or cords" means threads or cords which do not cross one another. Cords crossing with a small angle, thus forming a lozenged net with very elongated lozenges, are still considered to be "independent cords." Also, cords crossing one another but located in the same quadrants formed by the radial plane and the plane which is parallel to the mid-plane of the tire and which is located at the point of intersection of the considered cords, are assimilated to "independent cords."

More particularlarly, in tires embodying the invention:

(a) The carcass ply (or plies) can act as a tread reinforcement ply and usefully contribute towards strengthening the tread both in the transverse and longitudinal directions due to that portion of the carcass which departs noticeably from the radial direction under the tread;

(b) Inasmuch as the carcass is made up exclusively of independent cords and all of the cords are submitted to stresses in the same direction, the carcass is supple and does not cause parasitic deformations under the tread as opposed to what takes place with crossed carcasses. Moreover, the cord portions located on either side of the tread reinforcement remain in a radial plane, or substantially so, thus safeguarding the advantages inherent in a radial carcass in the sidewalls; and (c) Inasmuch as the carcass cords are not laid along the shortest path from one bead to the other, but deviate from this path in the region of the tread reinforcement, they are able to undergo slight overall displacements under the tread, without any substantial relative movements; thus the excessive strains sustained by entirely radial cords are avoided or substantially reduced.

Outside the zone where it runs radially, any cord of the carcass according to the invention can be controlled during manufacture of the tire to follow a path of any shape; it may have a constant or substantially constant bias; it may include one or several changes of direction at points or zones of discontinuity; finally, it may have a direction which varies continuously according to a given law. The advantages accruing from the invention are enhanced when the cords have, in their non-radial portion, an average inclination of at least 20° to the transverse direction. When the cord does not follow a straight course throughout the non-radial portion of its path, its part most inclined to the transverse direction of the tire should also make an angle of at least 20°.

It is advantageous that the radical portions of a given cord be connected with the non-radial portion or portions thereof through a zone of progressive change of direction.

It is also advantageous to arrange for the two ends of a given carcass cord to be anchored around the bead wires at points which are not located in the same radial plane. In this way, the cords which at any time are located within the area of contact with the road extend into a sector of the sidewalls which is greater than the length of said area, and the stresses which set up in this area are distributed over a correspondingly larger zone of the sidewalls.

The tread reinforcement intended to cooperate with the carcass can consist of but one ply of cords which are parallel to one another and laid obliquely with respect to the longitudinal direction of the tire in a direction opposite to that of the carcass cords in their non-radial portion.

The simplest embodiment of a tire made in accordance with the invention comprises a single tread reinforcement ply of cords laid obliquely to the longitudinal mid-plane of the tire and a single carcass ply of cords extending radially or substantially radially from each bead to each edge of the tread and then obliquely under the tread reinforcement ply in a direction opposite to that of the cords of the latter.

When the carcass consists of several superimposed cord plies, it is preferable that the cords of the successive plies have the same direction, so as not to constitute a lozenged net either in the sidewalls or under the tread. However, it is possible to depart slightly from this ideal structure, without going beyond the scope of this invention, by using cords which, as stated above, can be assimilated to independent cords. But such cords should not, in the sidewalls, depart from the radial plane by more than about 15°, and they should preferably be laid symmetrically to this plane. Moreover, such cords should, under the tread, remain in the same quadrants formed by the radial plane and the plane parallel to the longitudinal mid-plane and passing by the point of crossing of the cords. Better results are obtained, however, when there is no lozenged net of cords in the carcass.

Without departing from the spirit of the invention it is, of course, possible to supplement the single tread ply and/or carcass ply with additional plies of cords laid substantially in the same direction as the cords of the ply to which they are added.

According to a more elaborate form of the invention, the tread reinforcing ply may, in a manner known per se, be divided into several longitudinal partial plies either with an interval between them or abutting or overlapping transversely. The angle of the cords of such several partial plies can be identical in all of them or only in some of them; it can vary in every partial ply, either in the same or in the opposite direction. Preferably, superimposed tread and carcass plies have their cords making with the longitudinal direction of the tire angles of opposite signs. This condition should be fulfilled in at least one zone of superimposition of tread ply cords and carcass ply cords.

Also, in accordance with the invention, the cover may be constructed to include several superimposed tread plies, the cords of which extend in different directions and wherein some or all of these plies are continuous, i.e., extend over the whole width of the tread, or discontinuous. The tread reinforcement and the non-radial portion of the carcass may be wider than the tread, provided however, such transverse extension does not go further down than the mid-height of the sidewalls. In particular, the tread reinforcement may include narrow plies of cords inclined to the longitudinal direction, these plies being placed between the edges of the tread and the mid-height of each sidewall. In this case, the carcass portions located under these narrow plies comprise non-radial cords extending in a direction opposite to that of the cords of said narrow plies and at an angle with the longitudinal direction of the tire.

The carcass ply or plies can have any position with respect to the tread ply or plies. The order of superimposition of the various plies is not important.

The cords of the carcass in their non-radial portion, may be strengthened either by increasing the number of filaments they are made of, or by duplicating the carcass ply, in said portion, by means of an additional ply having a width not greater than that of the non-radial portion and containing cords substantially parallel to those of the non-radial portion of the carcass.

The carcass ply can also be divided into two portions, each of which extends from one bead of the tire to that edge of the tread which lies farther from said bead, the cords of each of these portions being radial in the said sidewall and non-radial and substantially parallel under the tread.

The body of tires built according to the invention can consist of any appropriate natural, artificial or synthetic material. Several different materials, or the same one, may be used for the various plies. The number and location of the plies should, of course, take into account the qualities inherent in the selected materials or materials.

The structure of the beads and of the tread can be designed according to any known arrangement. In particular the height of the carcass cord ply folded around the bead wire can be of any desired value. The beads can be reinforced in any known manner, for instance, by means of crossed cords.

The elimination of one tread ply, made possible by the presence of a non-radial portion under the tread, simplifies the manufacture of the tire and saves material. Instead of being detrimental to the performance of the tire, chiefly to its road holding ability, its resistance to wear and fuel consumption, this new structure unexpectedly and definitely enhances it. In particular, the resistance to rolling may be decreased by as much as about 25% as compared with a tire having a wholly radial carcass and a tread reinforcement with two or more plies. It has also been observed that a tire according to the invention has a greater mileage life than a conventional tire without suffering any damage (other than perforations or similar accidental injuries) requiring a major repair or even discarding the tire. Also, better cornering power was obtained, especially at high speed, resulting in greater safety and resistance to wear.

The tire structure according to the invention can be made by using any known processes of manufacture, but in accordance with the present invention a process is provided enabling the new tires to be manufactured in a particularly simple, efficient and economical way, which adds to the advantages of the new structure.

The method according to the invention for altering the direction of the cords of a ply made up of rubberized cords extending between its two edges perpendicular thereto consists in (a) placing over said ply, in the zone where it is desired to alter the direction of its cords, a second ply, the cords of which cross those of the first ply, whereafter (b) the assembly is submitted to a traction which is preferably parallel to the longitudinal edges of the first ply thereby causing the cords of the two superimposed plies to modify their orientation within the zone of overlapping, and finally (c) in maintaining the thus modified structure in its new position until the asesmbly is stabilized, e.g., by vulcanization of the elastomer in which the cords are embedded.

By subjecting to traction an assembly of two superimposed plies which adhere to each other and are made up of straight cords parallel to each other in each ply but crossing the cords of the adjacent ply, a rotation of the direction of the cords in each ply is caused in that area which adheres to the adjacent ply, such rotation being directed clockwise in one of the ply and counterclockwise in the other. In those parts of the ply which are not covered by the other ply the cords do not significantly alter their initial direction. A progressive change of direction takes place only at the zone of junction with the covering or tread ply. On either side of the zone of junction, all cords are substantially straight.

Thus, when laying up two plies of unequal width, one of them having its cords extending at an angle of 90° with respect to its longitudinal edges, and the other, of lesser width, having its cords running obliquely and towards the right with respect to those of the wider ply, a pull or traction exerted in a direction parallel to the longitudinal edges of the assembly alters the direction of the cords of each ply in the zone in which they overlap as follows; the cords of the wider ply extend toward the left while those of the narrower ply still extend towards the right but at an angle to the longitudinal direction of the ply of smaller value than before stretching took place. The value of the angles of both sets of cords after stretching largely depends on the initial value of these angles before stretching and on the percentage of stretch the plies have undergone.

Thus, the method according to the invention allows alteration of the path of the cords of a ply to any desired extent and in any desired zone. In case it is desired to modify the path of cords over more than one zone, a corresponding number of deforming plies must be adhered to the zones of the ply to be deformed.

One process for practicing the invention consists in laying the plies to be deformed around a cylinder or drum to build a sleeve, and in subsequently exerting a circumferential pull on the sleeve, for instance by increasing the diameter of the cylinder, so as to increase the circumference of the sleeve. In this way, the deformation of the cords of the overlapping zones of the plies is uniform all around the sleeve, i.e., along the whole length of the plies.

More particularly, the carcass ply is laid around the tire building drum, in the usual manner. Its cords extend at right angles to the circumferential edges of the ply, i.e., they are parallel to the generating lines of the building drum. The bead wires are then placed over the carcass ply, the ends of which are then folded around these wires, in the usual manner. The tread ply is applied around the carcass ply over the center portion thereof with the cords of the tread ply crossing those of the carcass ply at a suitable angle. Pressure is then exerted over the tread ply in order to make it adhere firmly to the carcass ply. The assembly is then given a toroidal shape by bringing the two bead wires closer together and inflating the space between the building drum and the carcass ply. During this shaping operation the cords of the carcass ply and those of the tread ply alter their position in the zone where both plies are superimposed, while they do not do so to any substantial extent in those parts of the carcass ply which are located on the right and on the left of the tread ply.

Although the shaping operation is preferably carried out with an assembly consisting only of one carcass ply topped by a tread ply, an assembly comprising several carcass plies and/or tread plies can be shaped in the same manner provided the cords of the superimposed carcass plies and/or tread plies run substantially parallel to one another in each group. It is also possible, after having shaped a one-ply carcass and one-ply tread assembly as mentioned above, to add further tread plies around the first one.

For a better understanding of the present invention reference may be had to the accompanying drawings in which:

FIGURE 1 is a cross sectional view of a portion of a tire cover embodying the present invention;

FIGURE 2 is a front elevational view showing a portion of the tire partially broken away to disclose the ply structure therein;

FIGURE 3 is a plan view showing schematically an assembly of two plies prior to shaping them;

FIGURE 4 is a schematic illustration of the two plies of the tire after shaping;

FIGURE 5 is a side elevational view and partly in section illustrating the building of a tire embodying the invention on a tire building drum;

FIGURE 6 is a side elevational view partially broken away illustrating the shaping of the tire cover on the building drum;

FIGURES 7 to 22 are schematic illustrations of various cord relations in tires embodying the present invention, there being shown in FIGURES 8, 10, 12, 13, 14, 16 18 and 22 only one cord representing each ply for purposes of clarity.

Figure 7:
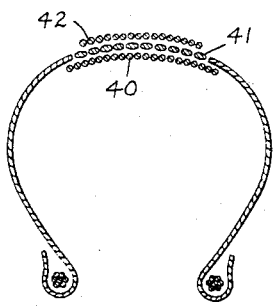

Referring to FIGURE 1, a pneumatic tire cover 1 embodying the invention comprises a tread 2, sidewalls 3 and 3' terminating in beads 4 and 4'. A carcass ply 5 extends from one bead to the other, its ends being folded around the bead wires 6 and 6'. As shown in FIGURE 2, the carcass ply 5 includes between each bead 4 and 4' and the tread 2 a plurality of cords, each having two portions 7 and 7' which are radially directed and, under the tread 2, an oblique portion 8 which crosses the oblique cords 9 of a tread ply. The oblique portion 8 of the cords made with the longitudinal mid-plane X–X' an angle α of about 41°, while the cords 9 make with this plane an angle β of about 20° in the opposite direction.

FIGURE 2 illustrates the two radial portions 7 and 7' of a single carcass ply located in two different radial planes and merging into the oblique portion 8 through zones 10 and 10' in which the change of direction is progressive.

The manner in which the plies are treated to produce the relations of the cords shown in FIGURE 1 is illustrated schematically in FIGURES 2 and 3.

As shown in FIGURE 3 a first ply 20 of cords 21 parallel to one another and at right angles to the longitudinal edges 22 of the ply is assembled with a second ply 23 adhering to the first ply over its central portion and having cords 24 which cross the cords 21 and are not at right angles with the edges 25 of the ply 23. The cords of the plies are embedded in synthetic or natural rubber compound or other suitable elastomer. When a pull is exerted on the two plies 20 and 23 in a direction parallel to these plies as shown by the arrows, the whole assembly is deformed as shown in FIGURE 4, i.e., both plies are now longer but narrower. The ply 20 comprises two side portions 20' in which the initial (transverse) direction of the cords has not been altered, and a central portion 20" in which the cords after having rotated clockwise, are now inclined to the left. Similarly, the cords 24 of ply 23 have rotated counterclockwise, thus reducing the angle they made with the longitudinal edges 25 of this ply. In the vicinity of these edges, the cords 21 of ply 20 change their direction progressively, whereas the ends of cords 24 remain straight.

In practice and in accordance with the invention, the plies may be assembled on a tire building drum 30 (FIGURE 5) provided with an inflatable shaping bag 31 shown partly in section. The carcass ply 5 (FIGURES 1 and 2) is laid around the building drum and the two bead wires 6 and 6' are positioned at each end of the drum over the carcass ply the ends of which have then been folded around these wires. Cords 32 of ply 5 lie parallel to the axis of the drum. On top of ply 5 and over the central portion thereof a tread ply 9 (FIGURES 1 and 2) has been caused to adhere firmly to ply 5; its cords 33 being inclined to those of ply 5. The tread proper (not shown) may be applied over the ply 9 either before or after the shaping operation has taken place as described hereinafter.

After the plies and bead wires are assembled the shaping bag 31 is inflated and the ends of the drum 30 are allowed to telescope to permit the bead wires to move toward each other as shown in FIGURE 6. During the shaping of the tire and as shown in the lower part of FIGURE 6 the cords 32 and 33 have moved to the positions corresponding to the positions of the cords 21 and 25 shown schematically in FIGURE 4. This position will be retained during and fixed by the vulcanization of the green tire in a conventional manner.

A pneumatic tire cover of the commercial size of 165 x 380 mm. having a structure such as the one shown in FIGURES 1 and 2 was built and shaped as shown in FIGURES 5 and 6 with the following components:

The carcass ply 5 was made up of steel cords 32 each consisting of three strands of three 0.12 mm. wires. These cords were laid parallel to one another, with a spacing of 0.85 mm. between their axes, in a usual calendering rubber. The tread ply 9 consisted of cords 33 of ten 0.18 mm. wires each, with a spacing of 1.10 mm. between their axes which are inclined at an angle of 30° to the longitudinal directions. After the shaping operation which caused an extension of 60%, the cords 33 of the tread ply had an inclination of but 20° to the longitudinal direction, and the cords 32 of the carcass ply had moved, in their portion covered by the tread ply 9, from their 90° position to one making an angle of 41° with the longitudinal plane, in a direction opposite to those of the tread ply. The tire is completed by applying sidewalls, tread, etc. to the carcass and vulcanizing and molding the assembly in the usual way.

Tests were carried out with a tire casing A as shown in FIGURES 1 and 2 and standard tire B which was the same as the tire A, except that it had two crossed tread plies and an exclusively radial carcass, with the following results:

|  | Tire A (lbs./ton) | Tire B (lbs./ton) |
| --- | --- | --- |
| Resistance to rolling* | 17.8 | 29.1 |
| Index of cornering power: |  |  |
| For a slip angle of 2° | 100 | 100 |
| For a slip angle of 4° | 200 | 120 |
| For a slip angle of 6° | 275 | 175 |
| Index of endurance | 160 | 100 |

*Measured at a speed of 62 m.p.h., each tire carrying a load of 1,045 lbs. and being inflated at 25 p.s.i. The cornering power was also measured under this load and pressure.

The endurance measurements were carried out on a conventional testing machine, the index 100 corresponding to the mileage normally covered before the standard tire is discarded.

It can be seen from the above results that the tire A in accordance with the invention has a better performance in three major characteristics and endurance than the standard tire, although the latter has excellent road qualities.

Figure 8:
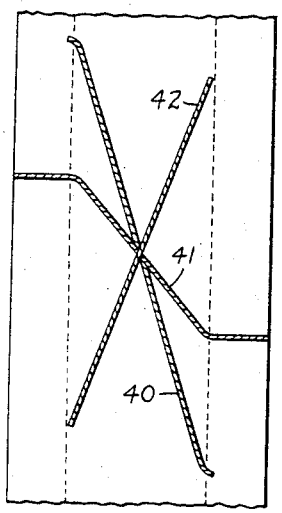

FIGURES 7 and 8 are schematic illustrations respectively in cross section and as a developed plan view, of a modification of the tire A shown in FIGURES 1 and 2. It differs from tire A by having one more tread ply. Thus, in the zone underlying the tread are three oblique plies 40, 41 and 42 which constitute a triangulated structure. The additional tread ply 42 can be laid after the carcass ply 41 and the tread ply 40 have been shaped. This structure with two tread plies and one carcass ply having radial cords in the sidewalls and oblique under the tread can be used for heavy duty tires.

Figure 9:
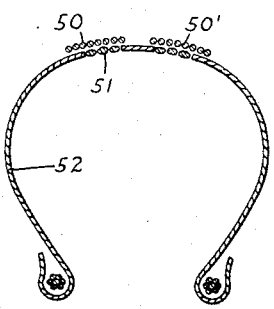
Figure 10:
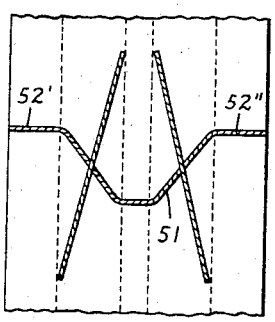

FIGURES 9 and 10 show a further modification of the new tire. In this tire, the tread 9 shown in FIGURES 1 and 2 has been replaced by two narrow plies 50 and 50′ located symmetrically with respect to the mid-plane of the tire, the angles of the cords of each of these narrow plies having opposite signs. As seen in FIGURE 10, the central portion 51 of the carcass ply 52 is in form of the letter V. Such a structure is obtained during the shaping operation due to the symmetrical inclination of the cords of the tread plies with respect to the direction of the carcass cords. In this arrangement, the two radial portions 52′ and 52″ of a given carcass cord lie in the same radial plane.

As in the case represented in FIGURES 7 and 8, it is possible to add to the structure shown in FIGURES 9 and 10 another tread ply which can be made up of cords extending continuously from one edge of the tread to the other, or of several narrow plies with cords of similar or different inclination and with angles of same or opposite signs.

Figure 11:
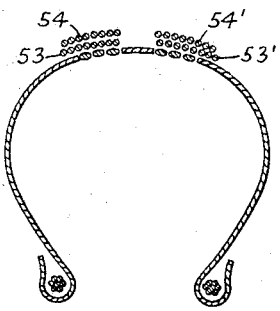
Figure 12:
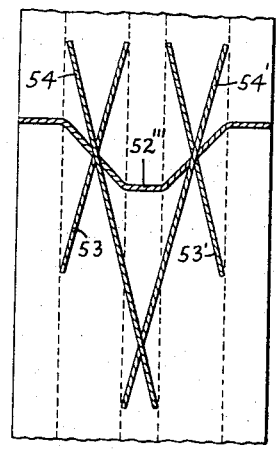

FIGURES 11 and 12 illustrate a tire structure comprising two narrow plies 54 and 54′ laid over the narrow plies 53 and 53′ and meeting in the zone of the mid-plane above the central radial portion 52″ of the carcass ply. In this instance, the narrow plies 54 and 54′ can be laid after the carcass ply and the narrow plies 53 and 53′ have been subjected to the shaping operation.

Figure 13:
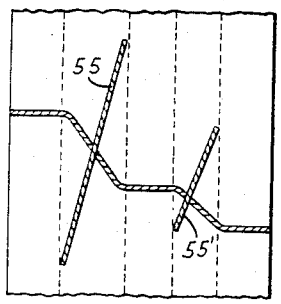
Figure 14:
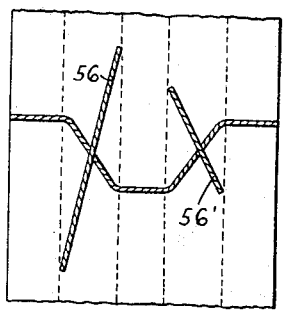

FIGURES 13 and 14 are plan views of two tire structures in which the narrow plies are not symmetrical. In the case of FIGURE 13, the angles of the cords of the narrow plies 55 and 55′ are unequal but of identical sign, whereas in FIGURE 14 those of the narrow plies 56 and 56′ are unequal and of opposite signs. There is a difference in width between ply 55 and ply 55′ on the one hand and between ply 56 and 56′ on the other hand.

FIGURES 15 and 16 are respectively a cross-sectional view and a completely developed plan view of a still further tire structure in which the tread reinforcement comprises a central ply 60 and two narrow side plies 60′ and 60″ located on opposite sides of the ply 60 between the edge of the tread and the mid-height of the sidewall. The cords of these three plies are parallel from one ply to another but the cords of the central ply 60 can have an orientation different from the cords in the side plies 60′ and 60″. Moreover, the angle of the cords of one of the side plies can be equal to the angle of the cords of the other side ply but inclined in the opposite direction. The angles of the cords can have various values, and one or both side plies can be located under the carcass ply, or the three plies 60, 60′ and 60″ can be replaced by a single continuous ply covering the entire zone covered by these three plies including the spaces therebetween.

It will be observed that in this example the cords of the carcass ply 61 have radial and oblique portions. Such an arrangement is obtained during the shaping operation because the ply 9 in FIGURE 5 has been replaced by several plies at a distance from one another.

The use of a tread ply 9 wider than the tread, or of a tread ply 60 not wider than the tread but complemented by side plies, stiffens the upper part of the sidewalls, thus displacing their zone of flexure towards the beads.

FIGURES 17 and 18 illustrate another form of the structure embodying the invention, in which the carcass ply 65 is reinforced by a first tread ply 66 having cords parallel to those of the oblique portion 66′ of the carcass ply and crossing those of the second tread ply 67. Such a ply structure can be produced by shaping a radial carcass ply topped by a first tread ply with radial cords and a second tread ply with oblique cords. The order of superimposition of these plies is not important and does not substantially alter the final cord arrangement. In the present instance, the oblique portion of the carcass cords is reinforced with cords having the same orientation. It is also possible to reinforce the carcass cords throughout their length or only along their radial portion by adding one or several additional radial plies before the shaping operation.

FIGURES 19 and 20 illustrate another tire structure in which the carcass ply comprises two plies 70 and 70′ extending each from a bead to the opposite edge of the tread. This ply structure increases under the tread the density of cords having the same orientation as the carcass cords. A tread ply 71 the cords of which cross those of the portions 70 and 70′ is laid above the latter to shape them into oblique relation beneath the tread.

FIGURES 21 and 22 illustrate another modification combining the ply structures illustrated in FIGURES 17 and 18 and 19 and 20. The carcass ply consists of two portions 75 and 75′ the non-radial portions of which are overlapped by a ply 76 of cords having the same orientation. This assembly is topped by a ply 77 the cords of which cross those of the carcass ply and the tread ply 76. This structure is obtained by shaping an assembly consisting of the three plies 75, 75′ and 76 with cords overlapping one another and parallel to the axis of rotation of the building drum, and of the external tread ply 77.

It is possible, within the scope of the invention, to provide other ply and tire structures, for instance by combining the characteristics of those described above. Accordingly, it is to be understood that the invention is not limited to the examples disclosed herein, but only as defined in the following claims.

I claim:

1. A method of making a tire cover comprising adhering to a surface of a first ply of substantially parallel cords extending substantially transversely of said ply a second narrower ply of substantially parallel cords with the cords of said narrower ply inclined with respect to the cords of said first ply, subjecting said first and narrower plies to traction to increase the length of said plies at least in the portion of said first ply to which said narrower ply is adhered to change the inclinations of said cords of said narrower ply and the cords of said portion relative to cords in the remainder of said first ply.

2. A method of making a tire cover comprising assembling a first ply of cords embedded in an uncured elastomer into a sleeve with said cords lying in planes extending radially from the axis of said sleeve, bonding to a surface portion of said sleeve a second narrower ply of substantially parallel cords embedded in an uncured elastomer, the cords of said narrower ply crossing and inclined at an acute angle to the cords of said sleeve, subjecting said narrower ply and at least the portion of said sleeve bonded to said narrower ply to traction to increase their circumferential length and change the inclinations of said cords of said narrower ply and the cords in said portion relative to the cords in the remainder of said sleeve and maintaining said changed inclinations until the curing of said tire.

3. The method of making a tire cover set forth in claim 2 in which said changed inclinations of said cords in said portion to the longitudinal direction of the tire average about 20°.

4. The method of making a tire cover set forth in claim 2 in which said narrower ply and said portion are subjected to traction by expanding said sleeve into a shape corresponding to a tire cover.

5. The method of making a tire cover set forth in claim 2 comprising attaching bead wires to opposite ends of said sleeve and subjecting said sleeve and said narrower ply to traction by expanding an inflatable bag in said sleeve while allowing said ends of said sleeve to move toward each other.

6. The method of making a tire cover set forth in claim 2 further comprising the step of incorporating an additional narrow ply of substantially parallel cords into the assembly of said first ply and said narrower ply following said traction, the cords of said first ply, said narrower ply, and said additional ply forming a triangulated structure.

7. The method of making a tire cover set forth in claim 2 in which said first ply is in two portions.

8. The method of making a tire cover set forth in claim 2 comprising bonding at least a third narrow ply to a surface of said sleeve in parallel relation to said second narrower ply prior to subjecting said sleeve to traction, said third ply having substantially parallel cords embedded in an uncured elastomer and inclined to and crossing said cords of said first ply.

9. The method of making a tire cover set forth in claim 8 in which said cords of said third ply are substantially parallel with the cords of said second ply.

10. The method of making a tire cover set forth in claim 8 in which said cords of said third ply are inclined at an acute angle to the cords of said first and second plies.

11. The method of making a tire cover set forth in claim 8 in which said second and third plies are spaced apart lengthwise of said sleeve.

References Cited

UNITED STATES PATENTS

| | | | |
|---|---|---|---|
| 1,183,553 | 5/1916 | Gammeter | 156—123 |
| 2,703,128 | 3/1955 | Darrow | 152—356 |
| 2,884,044 | 4/1959 | Hulswit et al. | 156—128 |
| 3,058,509 | 10/1962 | Maiocchi | 152—356 |
| 3,062,258 | 11/1962 | Maiocchi | 152—356 |
| 3,074,455 | 1/1963 | Richey | 152—356 X |
| 3,195,602 | 7/1965 | Keefe | 152—361 X |
| 3,299,935 | 1/1967 | Bush | 152—356 |

HAROLD ANSHER, *Primary Examiner.*